T. W. Johnson.
Making Extract from Tan Bark.

No. 90,848.      Patented Jan. 1, 1869.

Witnesses.
E. F. Kastenhuber.
Chas. Wahlers.

Inventor.
Thomas W. Johnson
pr
Van Santvoord & Hauff
Attys.

United States Patent Office.

THOMAS W. JOHNSON, OF NEW YORK, N. Y., ASSIGNOR TO HIMSELF AND HENRY C. JOHNSON, JR.

Letters Patent No. 90,848, dated June 1, 1869; antedated May 25, 1869.

IMPROVED APPARATUS FOR MAKING EXTRACTS FROM TAN-BARK.

The Schedule referred to in these Letters Patent and making part of the same.

*To all whom it may concern:*

Be it known that I, THOMAS W. JOHNSON, of the city, county, and State of New York, have invented a new and useful Improvement in Making Extracts from Tan-Bark; and I do hereby declare the following to be a full, clear, and exact description thereof, which will enable those skilled in the art to make and use the same, reference being had to the accompanying drawing, forming part of this specification, in which drawing—

Similar letters indicate corresponding parts.

Figure 1:
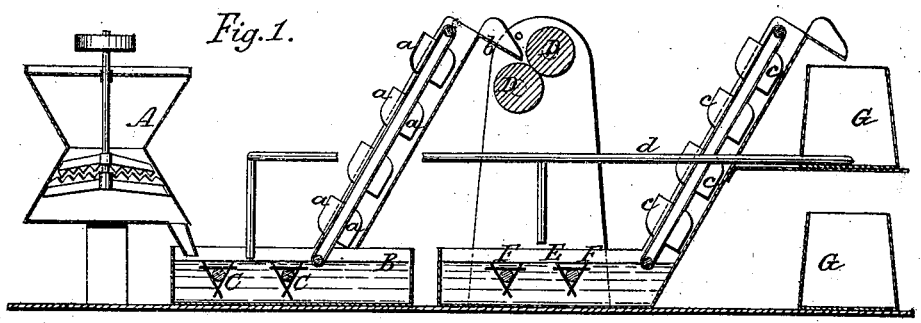
Figure 1 represents a longitudinal vertical section of this invention.
Figure 2:
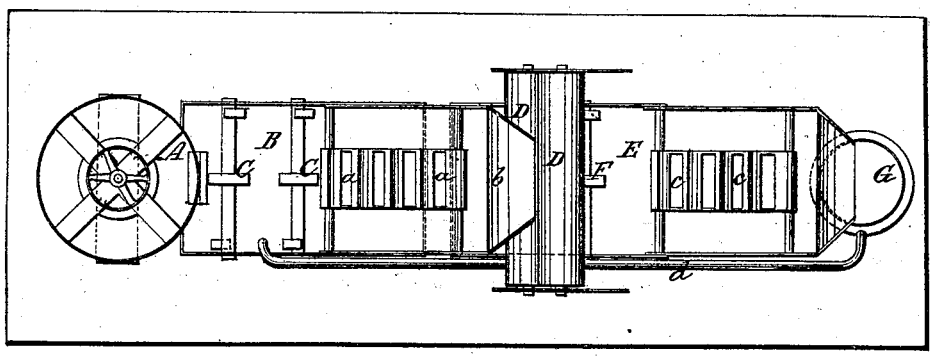
Figure 2 is a plan or top view thereof.

This invention consists in disintegrating the bark by grinding, dropping it into a saturating-tank, elevating and passing it through squeezing-rollers, resaturating the same, and elevating it into leaches, for washing or recompressing by rollers, in such a manner, that by combining the disintegrating action of the grinding and of the crushing-processes with the repeated saturating-processes, the astringent properties contained in the bark are more perfectly and easily extracted than by either process heretofore practised and known to me.

A represents a grinding-mill, of any suitable construction, for grinding or disintegrating tan-bark.

The ground bark, as the same is discharged from the mill, drops into the tank B, where the same is soaked and saturated with water, and in which it may be exposed to the action of beaters, C.

After having been well saturated with water, the ground bark is elevated, by means of wire buckets, *a*, and dropped on a chute, *b*, which conducts the same to the crushing-rollers D. These rollers are intended to run with a differential speed, so that they have both a crushing and a grinding-action, and that the ground bark, in passing through between them, is thoroughly disintegrated, exposing all the cells and fibres to the subsequent action of the water.

From the crushing-rollers D the disintegrated bark drops into the second tank, E, where it is again exposed to the action of beaters F, so that all the particles of bark are brought in intimate contact with the liquid in the tank E.

From this tank the disintegrated bark is again elevated, by wire buckets *c*, and either dropped into leaches G, to undergo a final washing, or it may be passed through a second set of rollers, to be squeezed dry.

If leaches are used, the liquid resulting from the final washing of the bark is carried back into the tanks, by means of a pipe, *d*.

By this process the bark, being first ground and then crushed, becomes more thoroughly disintegrated than it does by any other process heretofore practised and known to me, and I am enabled to extract all the astringent properties contained in the bark more perfectly, and with greater ease, than by the processes heretofore practised.

By subjecting the liquors, during the progress of the operation, to the action of heat, the process is materially facilitated.

I do not claim as my invention either of the various manipulations to which the bark is exposed, when separately considered; but having thus described my invention,

What I claim as new, and desire to secure by Letters Patent, is—

The within-described process of making extract from tan-bark, by exposing the same, in succession, to the disintegrating action of a grinding-mill, and then to the disintegrating action of crushing-rollers, substantially in the manner herein set forth.

THOS. W. JOHNSON.

Witnesses:
W. HAUFF,
C. WAHLERS.